United States Patent [19]
DeWinter et al.

[11] Patent Number: 5,835,364
[45] Date of Patent: Nov. 10, 1998

[54] HARMONIC ELIMINATING PWM CONVERTER

[75] Inventors: Frank A. DeWinter, Kitchener; Navid R. Zargari, Cambridge; Bin Wu, North York; Yuan Xiao, Toronto, all of Canada

[73] Assignee: Allen Bradley Company, LLC, Milwaukee, Wis.

[21] Appl. No.: 873,844

[22] Filed: Jun. 12, 1997

[51] Int. Cl.⁶ ........................................... H02M 1/14
[52] U.S. Cl. ................................. 363/45; 363/44
[58] Field of Search .................... 363/40, 41, 44, 363/45

[56] References Cited

U.S. PATENT DOCUMENTS 3,514,689   5/1970   Giannamore ............................ 363/44
3,913,005  10/1975   Cook ...................................... 323/247
3,976,931   8/1976   Sterling ................................... 363/44

*Primary Examiner*—Matthew V. Nguyen
*Attorney, Agent, or Firm*—Michael A. Jaskolski; John M. Miller; John J. Horn

[57] ABSTRACT

A PWM based converter including a Y-Δ, Y—Y transformer (or a Δ—Δ, Δ-Y transformer) wherein the Y-Δ portion of the transformer phase shifts input voltage by 30° with respect to the Y—Y portion of the transformer and thereby eliminates many low order supply line harmonics. The rectifier also includes two series connected PWM switching rectifiers, one rectifier receiving input voltages from the Y—Y portion of the transformer and the other rectifier receiving input voltages from the Y-Δ portion of the transformer, and a controller for controlling the first and second rectifiers so as to eliminate low order harmonics on the supply lines that are not eliminated by the transformer. A capacitive bank is required between each rectifier and the transformer.

20 Claims, 10 Drawing Sheets

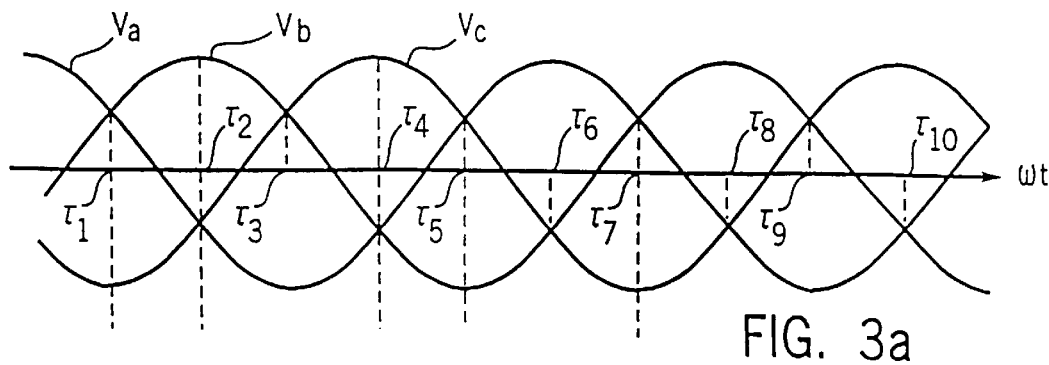
FIG. 3a PRIOR ART
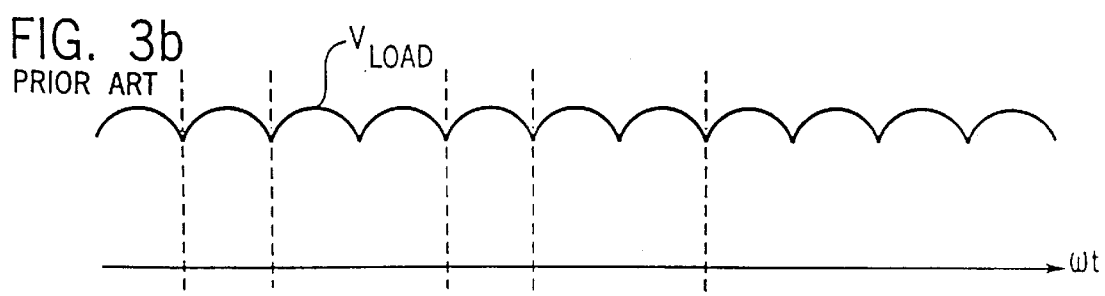
FIG. 3b PRIOR ART
FIG. 3c PRIOR ART
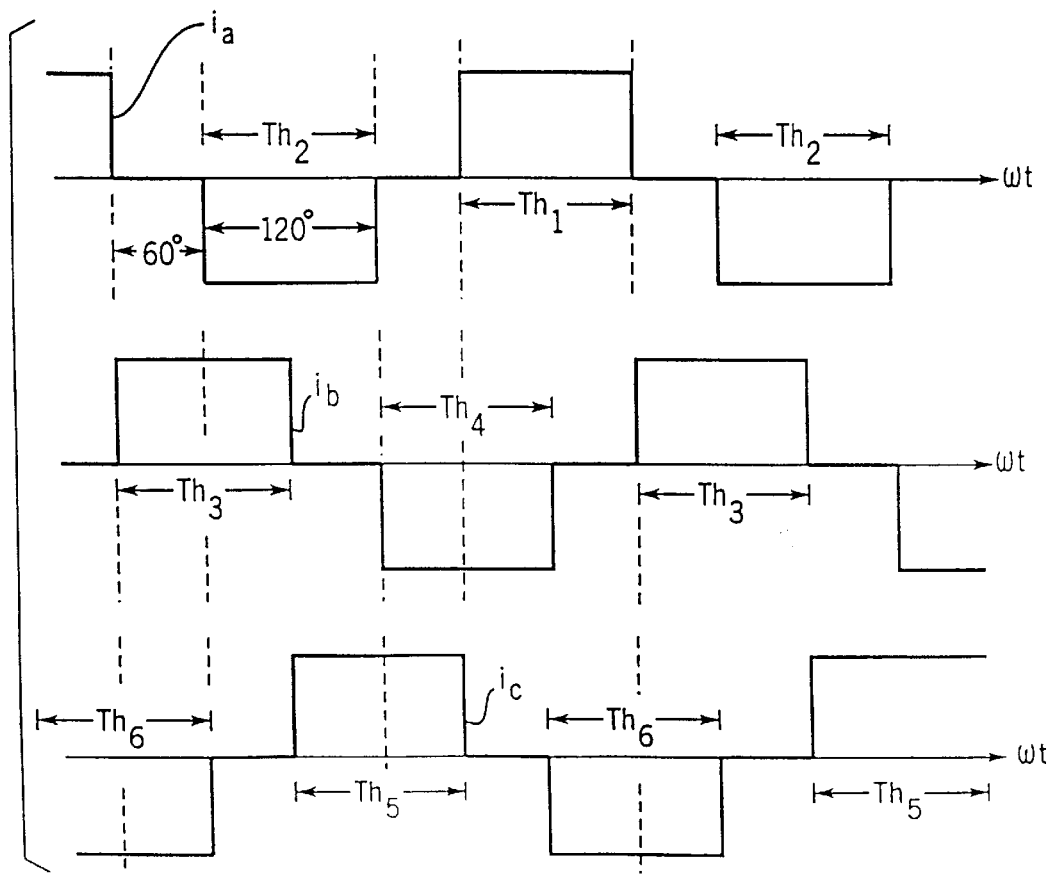

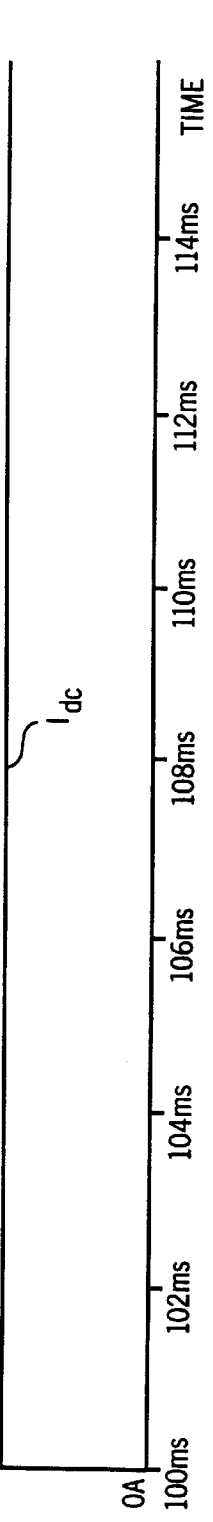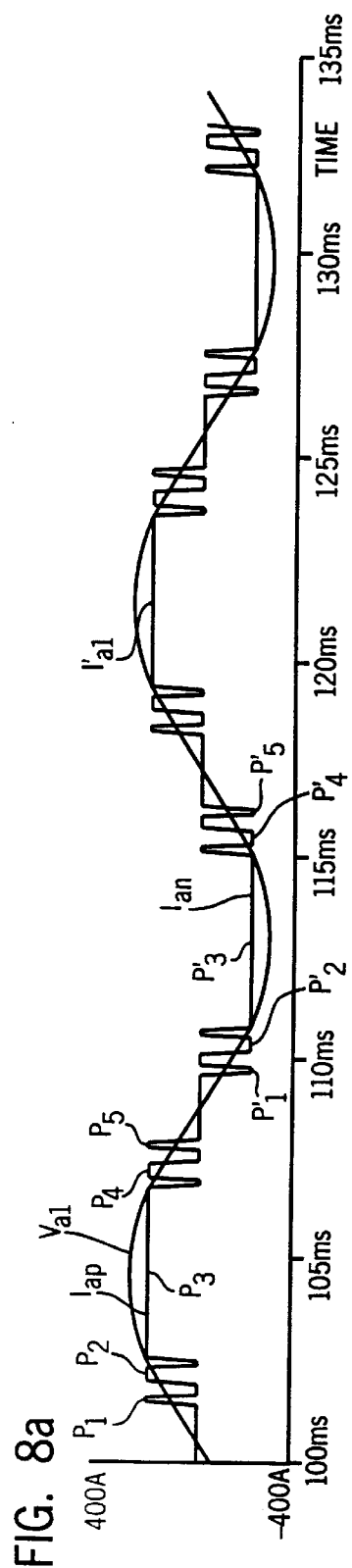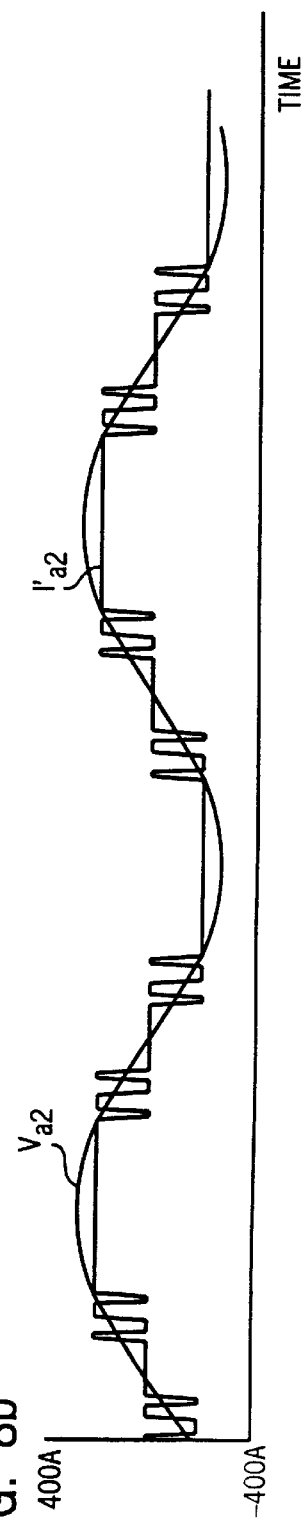

5,835,364

HARMONIC ELIMINATING PWM CONVERTER

CROSS-REFERENCES TO RELATED APPLICATIONS

Not applicable.

STATEMENT REGARDING FEDERALLY SPONSORED RESEARCH

Not applicable.

BACKGROUND OF THE INVENTION

The present invention relates to converters (e.g. inverters and rectifiers) and more particularly to a converter configuration and method of operation for reducing harmonic currents.

Power electronic rectifiers are used to connect machinery and other equipment that require power in offices and factories to utility power lines. All power electronic rectifiers can potentially act as non-linear loads creating power line disturbances and distorting utility waveforms by injecting harmonic currents into the utility grid.

To illustrate the effect of harmonic currents, consider FIG. 1 wherein a utility source 10 is shown connected at a point of common coupling (PCC) (i.e., a utility-customer connection point) to a load 12 (e.g., a first utility customer) and other loads (e.g., other utility customers) represented collectively by numeral 14. The utility source 10 includes a finite internal impedance $L_S$. Due to the internal impedance $L_S$, when load 12 draws a non-sinusoidal current (e.g. current including harmonics) from the source 10, the waveform at the PCC becomes distorted with harmonic currents which can cause machinery and equipment connected at the other loads 14 to malfunction.

In addition to voltage waveform distortion at the PCC, other problems related to harmonic currents include additional heating and possibly over voltages in utility distribution and transmission equipment, errors in metering and malfunctioning of utility relays, interference with communication and control signals and equipment damage from voltage spikes created by high frequency resonances resulting from notching.

Unfortunately, harmonic or non-linear loads comprise an ever increasing portion of the total load for a typical industrial plant. In fact, by 1992, harmonic loads had become such a pervasive problem that the Institute of Electrical and Electronic Engineers (IEEE) recommended stringent harmonics standards, including strict utilities limitations, in a document referred to in the industry as IEEE Standard 519 which has generally been accepted in North America. Standard 519 was written with the general understanding that harmonics should be within a reasonable limit at the PCC and therefore puts limits on individual and total (i.e., distortion from all loads connected at a PCC) harmonic distortion.

Many industrial loads include one or more voltage rectifiers that convert AC line voltage at the PCC to DC voltage for use within a plant. Referring to FIG. 2, one common rectifier design includes a three-phase thyristor bridge rectifier wherein three thyristor pairs 16, 18, 20 are connected in parallel between positive and negative DC rails 22, 24, respectively, each pair 16, 18, 20 including two series connected thyristors $Th_1$, $Th_2$, $Th_3$, $Th_4$, $Th_5$ and $Th_6$. A three-phase AC utility voltage source 38 provides power on three supply lines 40, 42 and 44, a separate line linked to each of the three pairs 16, 18, 20 at a node between an associated thyristor pair. Each line 40, 42, 44 has a source inductance $L_{sa}$, $L_{sb}$, or $L_{sc}$. Load 46 is attached across DC rails 22 and 24.

A control circuit (not shown) is typically connected to each of the thyristor switches $Th_1$–$Th_6$ to periodically provide firing pulses to thyristor gate terminals to turn on the switches $Th_1$–$Th_6$ in a timed sequence. As is well known in the art, once turned on, a thyristor remains on until current passing therethrough becomes zero. Because each thyristor $Th_1$–$Th_6$ is attached to the AC source 38, current therethrough reaches zero once during every half cycle of AC voltage. By controlling the thyristor firing pulses the AC voltage supplied by the source 38 can be converted to DC voltage across rails 22 and 24.

To simplify this explanation, it will be assumed that the firing pulses to the thyristors $Th_1$–$Th_6$ are always high so that each thyristor operates like an ideal diode conducting in the forward direction and blocking current in the reverse direction at all times.

Referring to FIG. 3a, ideal supply line voltage waveforms for the rectifier of FIG. 2 are illustrated. Voltages $V_a$, $V_b$, and $V_c$ are each sinusoidal and are separated by 120°. Referring also to FIG. 3c, thyristor $Th_1$ is on and conducting only when voltage $V_a$ is positive and greater than voltages $V_b$ and $V_c$ (e.g. prior to time $\tau_1$ and between $\tau_5$ and $\tau_7$). Thus, thyristor $Th_1$ is conducting during 120° of each 360° voltage cycle. Thyristor $Th_2$ is on and conducting only when voltage $V_a$ is negative and less than voltages $V_b$ and $V_c$ (e.g. between times $\tau_2$ and $\tau_4$ and between $\tau_8$ and $\tau_{10}$). Thus, like $Th_1$, $Th_2$ conducts during only 120° of each 360° voltage cycle. This causes the current $i_a$ drawn from source 38 to include many harmonic current components which result in a six step current form (see FIG. 3c) which is high for 120°, neutral for 60°, low for 120° and then neutral again for 60° prior to repeating the cycle.

Similarly, thyristor $Th_3$ conducts only when voltage $V_b$ is positive and greater than $V_a$ and $V_c$ (e.g. between $\tau_1$ and $\tau_3$ and between $\tau_7$ and $\tau_9$) and thyristor $Th_4$ conducts only when $V_b$ is negative and less than $V_a$ and $V_c$ (e.g. between $\tau_4$ and $\tau_6$ and after $\tau_{10}$). Similar concepts apply to thyristors $Th_5$ and $Th_6$ as illustrated. In effect, the current $I_d$ in load 46 flows through one thyristor $Th_1$, $Th_2$ or $Th_3$ from the top group. In the top group, the thyristor with its anode at the highest potential will conduct with the other two reverse based. In the bottom group the thyristor with its cathode at the lowest potential will conduct and the other two will be reverse biased.

Referring also to FIG. 3b, with the thyristors $Th_1$–$Th_6$ conducting as indicated above, the voltages supplied across rails 22 and 24 are such that the resulting load voltage $V_{LOAD}$ is a DC voltage with ripple. The instantaneous load voltage $V_{LOAD}$ consists of six segments per cycle of line frequency and hence this type of rectifier is commonly referred to as a six pulse rectifier.

In addition to rectifiers which draw six DC voltage segments from supply lines there are other rectifiers which draw other voltage waveforms characterized by greater than six segments which more closely reassemble AC line voltages. As well known in the control's industry, the characteristic harmonic currents that a rectifier generates are determined by the number of DC side voltage segments per cycle of line frequency according to the following equation:

$$h = kq \pm 1 \qquad \text{Eq. 1}$$

where h is the harmonic number (e.g., is an integer multiple of the fundamental component), k is any positive integer and q is the number of DC side voltage segments. Thus, the six segment rectifier illustrated in FIG. 2 will generate harmonics at the 5th, 7th, 11th, 13th, 17th, 19th, 23rd, 25th, etc., multiples of the fundamental.

As a general rule, the magnitude of each harmonic current is approximately equal to the magnitude of the fundamental current divided by the harmonic number. For example, the magnitude of the fifth harmonic current will typically be about 1/5th the magnitude of the fundamental current. Similarly, the magnitude of the 25th harmonic current will typically be about 1/25th the magnitude of the fundamental current. Thus, while all harmonic distortion is potentially dangerous and hampers equipment operation, lower order harmonic currents are the most problematic.

One solution for reducing harmonic currents has been to alter the input line currents using large reactive components located between the rectifier and AC input lines (e.g., a capacitive filter network). This solution is disadvantageous for a number of reasons. First, this solution can produce secondary adverse affects on the rectifier system such as causing an overvoltage condition due to supply line ring-up created by the reactive components which operate as a large reactive power supply. Second, large reactive networks are relatively expensive and therefore drive up system costs. Third, while absorbing harmonics, reactive networks also tend to impede a rectifier's dynamic response.

Another solution for reducing harmonic currents has been to design rectifiers drawing currents which have a greater number of steps (i.e. are more sinusoidal). For example, two module rectifiers are commonly used in high or medium voltage rectifier cases draw currents having twelve steps (see FIG. 5c). A typical two module rectifier consists of first and second six-pulse rectifiers (See FIG. 2) wherein the negative DC rail of the first rectifier is connected to the positive DC rail of the second rectifier. The positive rail of the first rectifier and the negative rail of the second rectifier provide the positive and negative DC rails for the load, respectively. The first rectifier is fed by a Y—Y transformer and the second rectifier is fed by a Y-Δ transformer so that corresponding rectifier phases are out of sync by 30°. For example, the voltage on the first phase of the first rectifier leads the voltage on the first phase of the second rectifier, the voltage on the second phase of the first rectifier leads the voltage on the second phase of the second rectifier and so forth. In this case, instead of having six segments per cycle of line frequency, the resulting instantaneous load voltage includes twelve segments per line frequency cycle, hence the term twelve-pulse rectifier.

Referring again to Equation 1, for a two module rectifier q is 12 and the rectifier produces harmonic currents at the 11th, 13th, 23rd, 25th, etc., multiples of the fundamental. Thus, twelve-pulse rectifiers appreciably reduce harmonic distortion by substantially eliminating the 5th, 7th, 17th, 19th, etc., harmonic currents. Nevertheless, in many cases, the remaining harmonic currents (e.g. 11th and 13th) have been known to disrupt utility power grids and cause many of the other problems identified above.

Yet another solution for reducing harmonic currents caused by rectifiers is to substitute controllable switching devices such as gate turn off (GTOs) devices for thyristors in the six-pulse rectifier configuration and impose rectifier control that rapidly turns the GTOs on and off during each conducting cycle in a manner calculated to eliminate harmonics. One such solution is described in IEEE Transactions On Power Electronics, Vol. 10, No. 5, September 1995 by Karshenas, et al., entitled "Generalized Technique of Selective Harmonic Elimination and Current Control in Current Source Inverters/Converts". Therein, by controlling GTO conducting times harmonic currents are eliminated. During each half cycle of line frequency, this reference requires one GTO conducting period to provide a fundamental current component and at least two additional GTO conducting periods to eliminate each harmonic current. Where N is the number of harmonics to be eliminated, and the line frequency is 60 Hz, the number of conducting periods for each switch can be determined according to the following equation:

$$(2N+1)(60) \qquad \text{Eq. 2}$$

Thus, to eliminate the 5th, 7th, 11th, 13th, 17th, and 19th harmonics using this solution, according to Equation 2, the GTO switching frequency would have to be at least 780 Hz.

While state of the art switching devices (e.g., GTOs) are capable of switching frequencies that exceed 780 Hz, switching losses result every time a switch is turned on or off. When a switch is turned on, voltage thereacross typically cannot reach a zero value prior to current passing therethrough. Simultaneous current through the switch and voltage across the switch causes unrecoverable power loss. Similarly, when a switch is turned off, current continues to pass therethrough for a short time during which voltage thereacross rises. Once again power loss occurs. While the switching loss associated with a single switching occurrence is relatively small, at high switching frequencies the cumulative effect of switching losses is appreciable on final load voltage. Therefore, while GTO type rectifiers can be used to reduce harmonic currents, resultant switching losses may be unacceptably high for some applications.

Once a rectifier changes AC utility line voltage to DC voltage, prior to use in a factory or office building, often the DC voltage must be inverted to provide a controlled AC voltage for driving machinery and appliances. One common solution to convert DC to a suitable AC voltage is by using a pulse width modulating (PWM) inverter which receives the DC voltage and converts the voltage to three phase AC line voltage using a plurality of controllable switching devices such as GTOs. One such solution is described in Mohan's *Power Electronics*, 2nd Edition, p. 225–228, published by John Wiley & Sons, Inc. (1995). Therein, by controlling GTO on-off switching DC voltage is inverted and three phase AC voltage is generated. Unfortunately, as above, where GTOs are used to eliminate utility line harmonics, switching losses result every time a PWM switch is turned on or off. Exacerbating the situation at the inverter end, the switching frequency must be extremely high to provide substantially sinusoidal load voltages with little harmonic distortion.

Therefore, it would be advantageous to have a rectifier configuration that eliminates most of the low order harmonic currents caused by voltage rectification without requiring large reactive components or causing high switching losses. In addition, it would be advantageous to have an inverter configuration which provides substantially sinusoidal output voltage with reduced switching losses.

BRIEF SUMMARY OF THE INVENTION

The present invention includes a rectifier for minimizing harmonic currents on AC supply lines. The inventive rectifier includes two PWM rectifiers wherein the negative DC rail of a first of the rectifiers is connected to the positive DC rail of the second rectifier so as to form a two-module PWM rectifier. A DC load is connected across the positive rail of the first rectifier and the negative rail of the second rectifier.

The first PWM rectifier receives three-phase AC voltage from a first intermediate source (e.g. a Y—Y or Δ—Δ transformer) and the second rectifier receives three-phase voltage from a second intermediate source (e.g. a Y-Δ or Δ-Y transformer). The three-phase voltage supplied to the first rectifier leads the three-phase voltage supplied to the second rectifier by 30°. A PWM controller is used to control the PWM rectifiers by firing rectifier switches in a pattern which eliminates the 11th and 13th harmonic currents. The sources which are out of phase by 30° cooperate to eliminate the 5th, 7th, 17th and 19th harmonics. As a result, neglecting the effect of preferred input capacitors, the lowest order harmonic in the line input currents is the 23rd harmonic and the line current and voltage remain substantially sinusoidal having little if any appreciable effect on the power grid. With properly selected input capacitors, the 23rd harmonic and all other higher order harmonics are considerably reduced.

Thus, one object of the present invention is to reduce harmonic currents on rectifier input lines. To this end, sources described above are combined with a PWM switching technique to eliminate all harmonics that are lower than the 23rd harmonic.

Another object is to reduce harmonic currents without requiring large reactive components. When the switching frequency of rectifier switches is high, if reactive components are required at all, their size is relatively small. In the present case the 5th, 7th, 11th, 13th, 17th and 19th harmonics are eliminated, the equivalent switching frequency is a relatively high 780 Hz (i.e. the switching frequency that would be required to eliminate the 5th, 7th, 11th, 13th, 17th and 19th harmonics using the PWM switching technique alone).

Yet another object of the invention is to achieve the above identified objects without requiring a high actual switching frequency. The switching frequency for the PWM switches is only 300 Hz. This is the lowest possible switching frequency required to eliminate two harmonics (i.e. See Equation 2).

Still one other object of the invention is to reduce harmonic currents without generating excessive switching losses. All harmonics below the 23rd harmonic are substantially eliminated with a switching frequency of 300 Hz. At 300 Hz switching losses are considerably reduced.

Another aspect of the present invention is the use of capacitors between the transformers and the PWM inverters. The capacitors, in conjunction with leakage reactance from the input transformer or line reactance provide a second order high pass filter which filters out high order input current harmonics. The break point of the filter can be set to approximately the 12th harmonic so as to reduce the 23rd and higher order harmonics.

Further, the invention includes an inverter topology for reducing harmonics in load currents. To this end, the invention includes a two-module inverter including two stacked PWM inverters linked to a single DC source wherein corresponding output phases are linked (i.e. first phases are linked, second phases are linked, etc.). The first inverter is controlled such that it generates a substantially sinusoidal output current set which include 5th, 7th, 17th and 19th harmonics. The second inverter is controlled such that it generates a current set which mirrors the first current set but lags the first set by 30°. Each current set is fed to a separate primary winding of a transformer which includes a single secondary winding. In one embodiment, one primary winding is "Δ" configured and the other primary winding is "Y" configured. The transformer combines the currents from the first and second inverters to produce output currents on first, second and third output lines. When the first and second inverter currents are combined the 5th, 7th, 17th and 19th harmonics cancel and sinusoidal currents result.

Yet one other object is to reduce PWM switching to conserve power. With stacked inverters which generate currents that are 30° out of phase, many output harmonics are eliminated by adding output currents and switching required to provide sinusoidal outputs is greatly reduced.

The foregoing and other objects and advantages of the invention will appear from the following description. In the description, reference is made to the accompanying drawings which form a part hereof and in which there is shown by way of illustration several preferred embodiments of the invention. Such embodiments do not necessarily represent the full scope of the invention, however, and reference must be made therefore to the claims herein for interpreting the scope of the invention.

BRIEF DESCRIPTION OF THE SEVERAL VIEWS OF THE DRAWINGS

FIGS. 3a–3c are voltage and current wave forms associated with the rectifier illustrated in FIG. 2;

FIG. 7g is a graph illustrating DC load current;

FIGS. 8a and 8b are graphs illustrating input currents for a single phase of the rectifier of FIG. 4.

DETAILED DESCRIPTION OF THE PREFERRED EMBODIMENTS

I. Rectifier

A. Theory

Figure 5A:
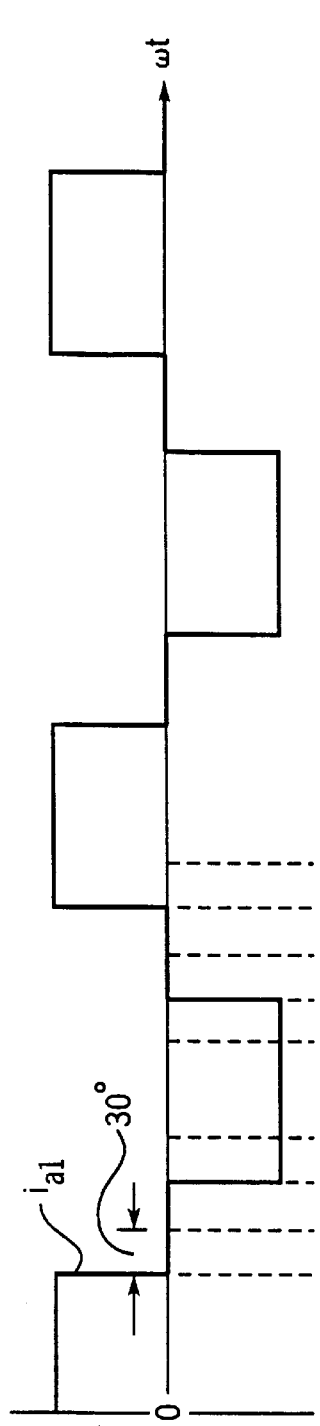
FIGS. 5a–5c illustrate 12-pulse rectifier currents.

Referring to FIG. 5a, a current waveform $i_{a1}$ similar to the waveforms of FIG. 3c which is drawn by a six pulse rectifier from a single AC supply line is illustrated. As can be seen waveform $i_{a1}$ is periodic and includes harmonic components. According to Equation 1, for a six pulse rectifier, the supply line current will include harmonics at the 5th, 7th, 11th, 13th, 17th, 19th, 23rd, etc., multiples of the fundamental current.

Figure 5B:
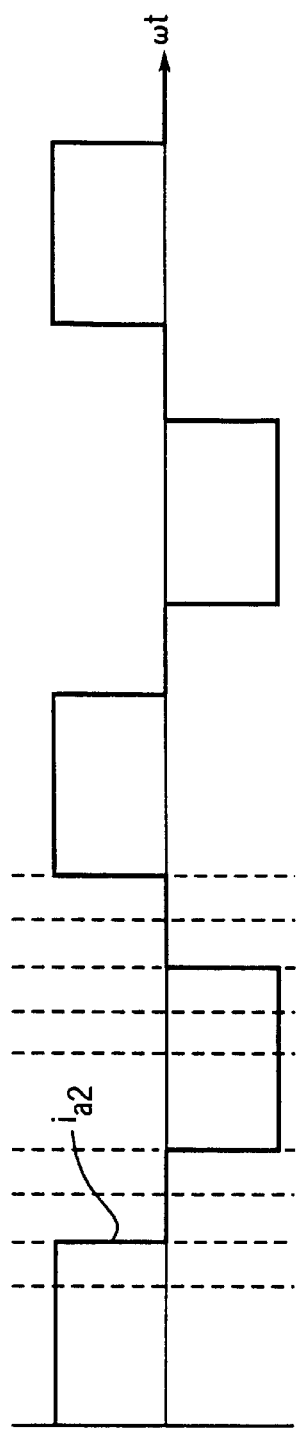

Referring also to FIG. 5b, current waveform $i_{a2}$ is identical to waveform $i_{a1}$ of FIG. 5a except that it lags waveform $i_{a1}$ by 30°. In this case, waveform $i_{a2}$ itself generates the same harmonics as waveform $i_{a1}$ except that the harmonics drawn are shifted or delayed by 30°.

Figure 5C:
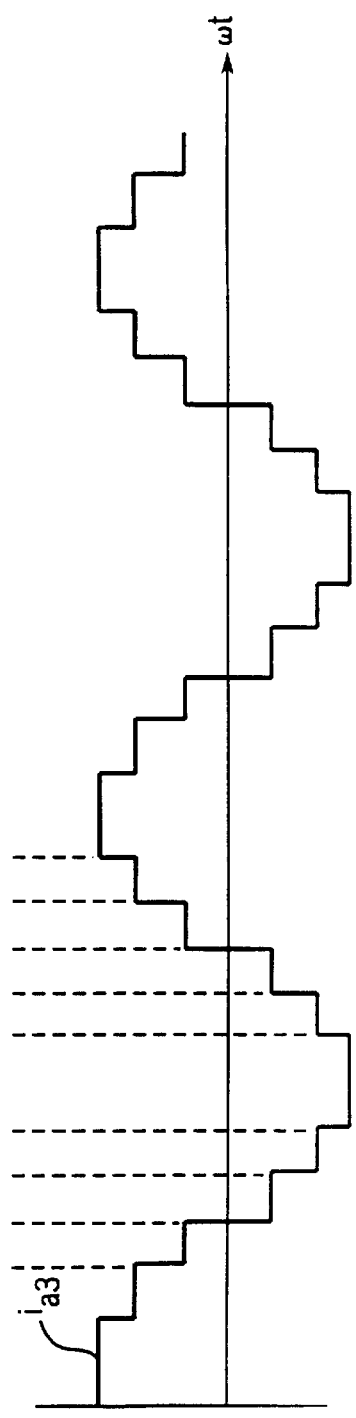
Figure 6:
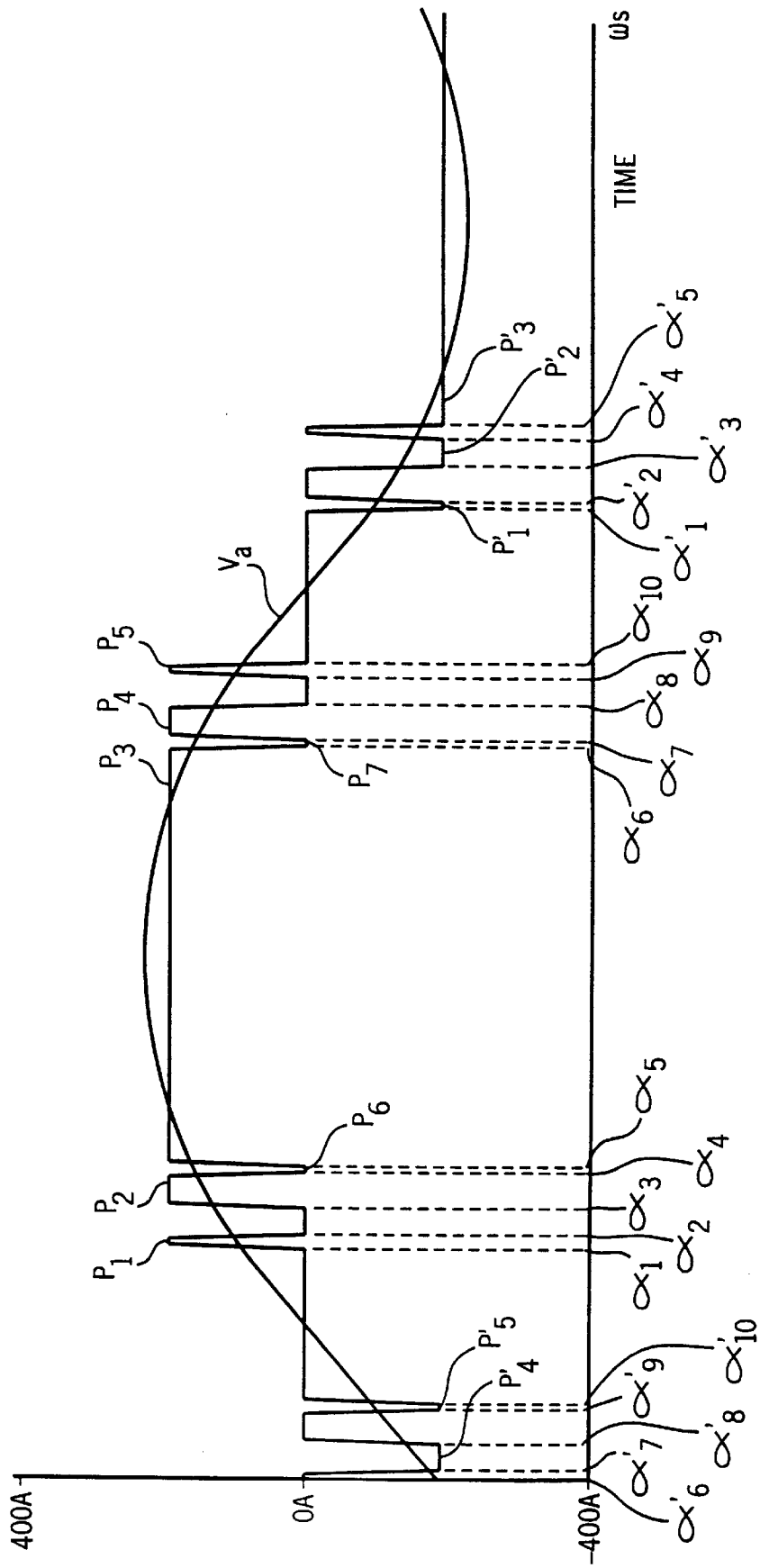
FIG. 6 is a graph illustrating a rectifier current for the rectifier of FIG. 4.

Referring to FIGS. 5a–5c, current waveform $i_{a3}$ can be generated on a primary winding of a transformer by drawing currents $i_{a1}$ and $i_{a2}$ through corresponding secondary windings of a Y—Y, Y-Δ transformer. Clearly waveform $i_{a3}$ is more sinusoidal than $i_{a1}$ or $i_{a2}$ and therefore waveform $i_{a3}$ contains less harmonic components than either waveforms $i_{a1}$ or $i_{a2}$.

Where six step currents are out of phase by 30° and are "added" together via a Y—Y, Y-Δ transformer, a twelve step current and twelve segment voltage result having harmonic components determined by Equation 1 where q is 12. Thus, the 5th, 7th, 17th and 19th harmonics can be eliminated by "adding" two six-step currents which are 30° out of phase via a transformer.

Where a rectifier is configured using fully controllable switches (i.e. switches that can be turned on and off at precise instances such as GTOs, BJTs, etc.), instead of current from a line having the six step wave form illustrated in FIG. 5a, a waveform like that in FIG. 6 having several current pulses per half-cycle of line voltage $V_a$ can be generated. In a preferred embodiment of the present invention the current pulses during every half cycle of line voltage $V_a$ include a main pulse $P_3$ or $P_3'$, two harmonic elimination pulses $P_1$ and $P_5$ and two residual pulses $P_2$ and $P_4$ which result from turn off periods $P_6$ and $P_7$ which are provided at the beginning and end of pulse $P_3$ during which the associated switch is turned off. In FIG. 6, pulses during the negative half-cycles of line voltage $V_a$ are identified by a prime following the pulse identifier (i.e. $P_1'$–$P_5'$). The harmonic elimination pulses $P_1$ and $P_5$ form a first pulse pair and residual pulses $P_2$ and $P_4$ form a second pulse pair. By providing the pulse pairs at specific chop angles $\alpha_1$–$\alpha_{10}$ with respect to the beginning of an associated half-cycle of line voltage $V_a$, the first and second pulse pairs can be used together to eliminate two harmonic current components. There are only two independent chop angles $\alpha_1$ and $\alpha_2$. The other chop angles $\alpha_3$–$\alpha_{10}$ are dependent on angles $\alpha_1$ and $\alpha_2$ according to the following equations:

$$\alpha_3 = 30° \quad \text{Eq. 3}$$

$$\alpha_4 = 60° - \alpha_2 \quad \text{Eq. 4}$$

$$\alpha_5 = 60° - \alpha_1 \quad \text{Eq. 5}$$

$$\alpha_6 = 120° + \alpha_1 \quad \text{Eq. 6}$$

$$\alpha_7 = 120° + \alpha_2 \quad \text{Eq. 7}$$

$$\alpha_8 = 150° \quad \text{Eq. 8}$$

$$\alpha_9 = 180° - \alpha_2 \quad \text{Eq. 9}$$

$$\alpha_{10} = 180° - \alpha_1 \quad \text{Eq. 10}$$

It can be shown that the nth harmonic current $I_n$ in FIG. 6 can be expressed as:

$$I_n = \frac{4 I_{dc}}{n\pi} \left[ \cos n\alpha_1 - \cos n\alpha_2 + \cos n\left(\frac{\pi}{3} - \alpha_1\right) - \cos n\left(\frac{\pi}{3} - \alpha_2\right) + \cos \frac{n\pi}{6} \right] \quad \text{Eq. 11}$$

where $I_{dc}$ is the amplitude of a DC link current. In order to determine the correct chop angles $\alpha_1$ and $\alpha_2$, the numbers n of the two harmonics to be eliminated can be separately plugged into Equation 11 to provide two non-linear transcendental equations, one equation for each harmonic to be eliminated. Then, because the harmonics are to be eliminated, $I_n$ in each of the two equations can be set to zero (i.e. the harmonic should have a zero amplitude). Next, one of the equations can be solved for angle $\alpha_1$ in terms of angle $\alpha_2$ and the result can be plugged into the other equation to determine angle $\alpha_2$. Once angle $\alpha_2$ is determined it can be plugged into either of the two non-linear equations which can then be solved for angle $\alpha_1$.

For the purposes of the present invention, PWM switches are controlled such that currents drawn from the supply lines do not include the 11th or 13th harmonic components. Thus, numbers 11 and 13 are substituted for n in Equation 11 to provide two equations with $\alpha_1$ and $\alpha_2$ as the only unknowns. Each equation (i.e. $I_{11}$ and $I_{13}$) is set to zero, $I_{dc}$ is set to 1.0 and the two equations are solved for $\alpha_1$ and $\alpha_2$ yielding $\alpha_1 = 19.0°$ and $\alpha_2 = 21.74°$. Next, angles $\alpha_1$ and $\alpha_2$ are plugged into Equations 3–10 to determine $\alpha_3$ through $\alpha_{10}$. In the present case, $\alpha_3 = 30°$, $\alpha_4 = 38.26°$, $\alpha_5 = 41°$, $\alpha_6 = 139°$, $\alpha_7 = 141.74°$, $\alpha_8 = 150°$, $\alpha_9 = 158.26°$ and $\alpha_{10} = 161°$.

Thus, by controlling rectifier switches such that pulses $P_1$–$P_7$ are defined by angles $\alpha_1$–$\alpha_{10}$ as indicated above, the 11th and 13th harmonic components of the line current are eliminated.

Combining two six pulse line current waveforms which are out of phase by 30° and the PWM switching technique identified above, all harmonic current components less than the 23rd order are eliminated and rectifier generated harmonics on a power grid are minimized. Also, the switching frequency required to eliminate the lowest order harmonics (i.e. 5th, 7th, 11th, 13th, 17th and 19th) is only five times the line frequency (e.g. where the line frequency is 60 Hz, the switching frequency will be 300 Hz). Nevertheless, according to Equation 2, the effective switching frequency is 780 Hz.

B. Configuration

Figure 1:
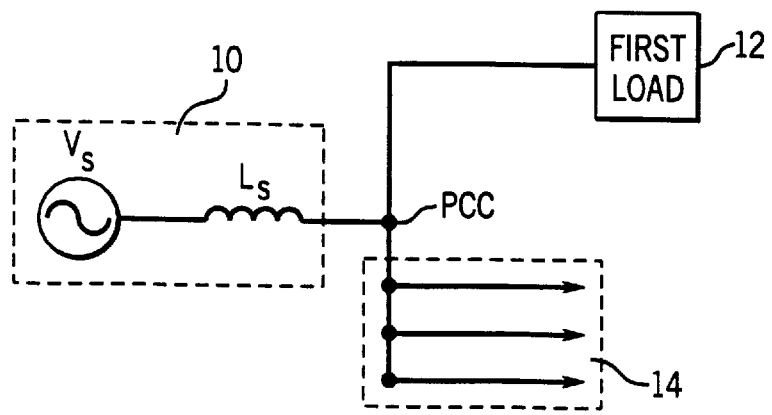
FIG. 1 is a schematic diagram of a voltage source connected to a plurality of loads.
Figure 2:
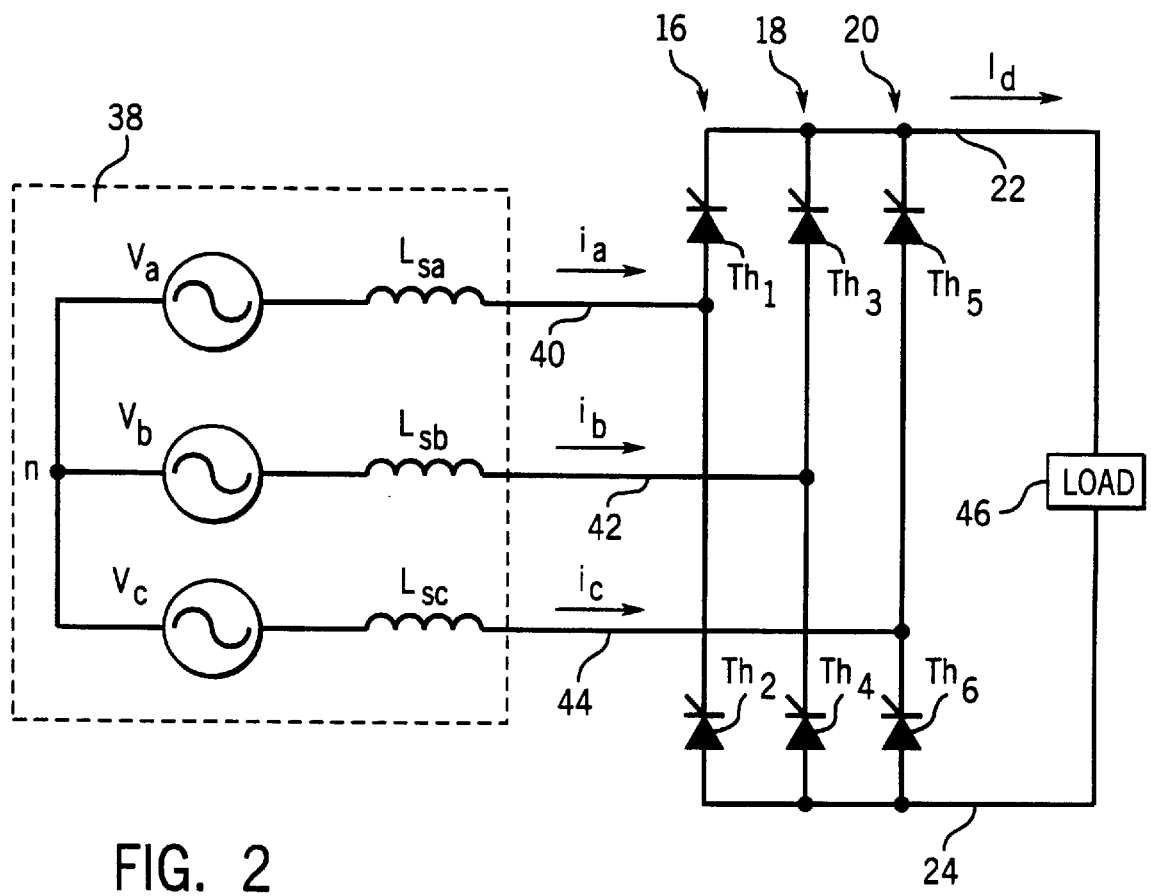
FIG. 2 is a schematic of a prior art rectifier.
Figure 4:
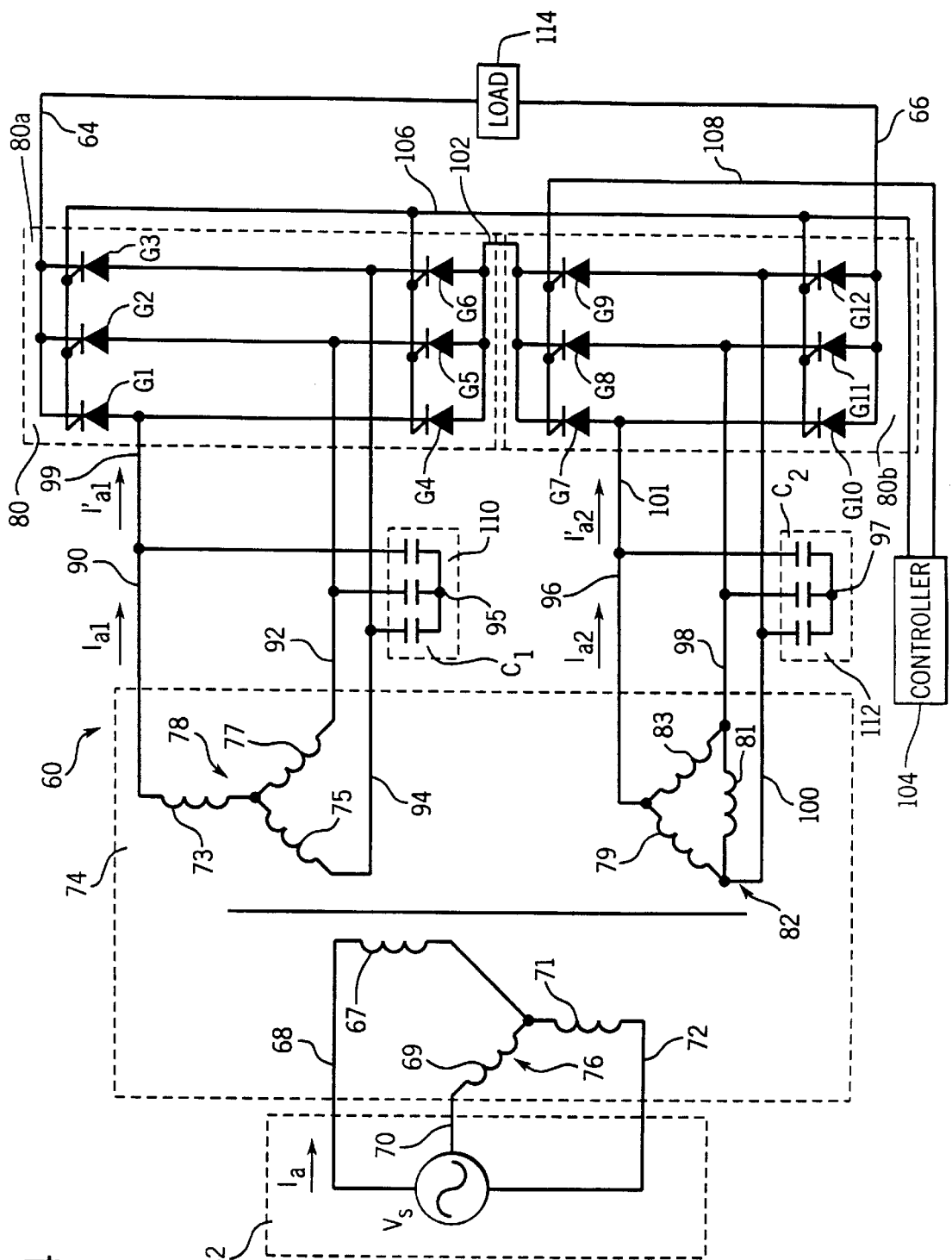
FIG. 4 is a schematic of a rectifier according to the present invention.

Referring now to FIG. 4, the present invention will be described in the context of the exemplary 12-pulse PWM rectifier 60 which is used to convert AC voltage provided by voltage source 62 to DC voltage on positive and negative DC rails 64, 66, respectively. The rectifier 60 includes a transformer 74 and a two-module or so-called "12-pulse" converter 80.

The transformer includes nine separate windings 67, 69, 71, 73, 75, 77, 79, 81 and 83 arranged to form a "Y—Y" configuration and a "Y-Δ" configuration. Windings 67, 69 and 71 are arranged to form a primary Y set of windings 76, windings 73, 75 and 77 are arranged to form a secondary Y set of windings 78 and windings 79, 81 and 83 are arranged to form a secondary Δ set of windings 82. Set 76 is independently coupled to set 78 and is also independently coupled to set 82. Sets 76 and 78 together form a first intermediate source and sets 76 and 82 form a second intermediate source.

Referring to FIG. 3a, source 62 provides three phase AC sinusoidal voltages $V_a$, $V_b$ and $V_c$ on three supply lines 68, 70 and 72. The voltage on line 68 leads the voltage on line 70 by 120° and the voltage on line 70 leads the voltage on line 72 by 120°. A separate supply line 68, 70 or 72 is connected to each of the primary windings 67, 69 and 71.

Windings 73, 75 and 77 are connected to converter input lines referred to as first, second and third intermediate lines 90, 92 and 94, respectively. Similarly, the points between Δ connected windings 79, 81 and 83 are connected to converter input lines referred to as fourth, fifth and sixth intermediate lines 96, 98 and 100, respectively.

Rectifier 80 includes twelve separate gate turn off (GTO) switches G1, G2, G3, G4, G5, G6, G7, G8, G9, G10, G11 and G12 which are arranged so as to form first and second PWM converters 80a, 80b wherein the negative rail of the first converter 80a is connected to the positive rail of the second converter 80b, the positive rail of the first converter 80a provides positive DC rail 64 and the negative rail of the second converter 80b provides the negative DC rail 66. For the purposes of this explanation, the negative rail of converter 80a and the positive rail of converter 80b will be referred to as central node 102.

Referring still to FIG. 4, first and fourth switches G1 and G4 are arranged as a series pair between central node 102 and positive rail 64 with the anode of switch G4 connected to central node 102 and the cathode of switch G1 connected to the positive rail 64. Similarly, switches G2 and G5 and switches G3 and G6 are also arranged in series pairs between common rail 102 and positive DC rail 64 so that current travels through those switches from central node 102 to positive rail 64. Switches G7 and G10 are arranged as a series pair between negative DC rail 66 and central node 102 so that current passes from negative rail 66 to central node 102. Similarly, switches G8 and G11 and switches G9 and G12 are also arranged as series pairs between negative rail 66 and central node 102. Input line 90 which is linked to winding 73 which in turn corresponds to primary winding 67 is connected between the switch pair including switches G1 and G4. Similarly, line 94 which is linked to winding 69 via winding 77 is connected between switches G2 and G5, line 92 which is linked to winding 72 via winding 75 is connected between switches G3 and G6, line 96 which is linked to winding 67 via secondary set 82 is connected between switches G7 and G10, line 100 which is linked to winding 70 via set 82 is connected between switches G8 and G11 and line 98 which is linked to winding 71 via leg 82 is connected between switches G9 and G12.

A PWM controller 104 is provided for turning the switches G1 through G12 on and off and thus controls conducting periods of each switch G1 through G12. The controller 104 is connected to the switches of converter 80*a* via a first bus 106 and is connected to the switches of converter 80*b* via a second bus 108. The first bus 106 includes six separate control lines (not shown), one line for each of the six switches G1 through G6 while the second bus 108 likewise includes six separate control lines (not shown) one for each of switches G7 through G12. Each control line is connected to a separate gate terminal of an associated switch G1 through G12 to provide control signals to the switch.

A capacitive filter network 110 is provided between transformer leg 78 and converter 80*a*. The filter network 110 includes three relatively small capacitors collectively referred to as $C_1$, a separate capacitor connected between each of lines 90, 92 and 94 a common node 95. A similar filter network 112 including three small capacitors collectively referred to as $C_2$ is provided between transformer leg 82 and converter 80*b*, a separate capacitor connected between each of lines 96, 98 and 100 and a common node 97. Although not illustrated, each line 90, 92, 94, 96, 98 and 100 is characterized by a line reactance and windings 73, 75, 77, 79, 81 and 83 include at least some amount of leakage reactance.

A load 114 is connected across the positive and negative DC rails 64, 66, respectively.

C. Switch Firing Sequence

Because both of the first and second converters 80*a* and 80*b* operate in the same manner, in order to simplify this explanation only operation of the first converter 80*a* will be described in detail and where necessary to understand operation of the invention, the combined effects of the two converters 80*a*, 80*b* will be explained.

In addition, because each of the series pairs of switches in each converter operates in a similar manner, only a single series pair of switches including switches G1 and G4 will be described here in detail and operation of other switches will only be described where necessary to understand the invention.

Referring to FIGS. 3*a* and 4, source 62 provides sinusoidal line voltages $V_a$, $V_b$ and $V_c$ through transformer winding sets 76 and 78 to converter 80*a* via intermediate lines 90, 92 and 94, respectively. Similarly, the line voltages are provided to lines 96, 98 and 100 via transformer winding sets 76 and 82. For the purposes of this explanation, the line-to-neutral voltage on line 90 which appears at point 99 will be referred to as $V_{a1}$ and the line-to-neutral voltage on line 96 which appears at point 101 will be referred to as $V_{a2}$. Switches G1 and G4 are used to connect line 90 alternately between the positive rail 64 and node 102, so as to provide the current waveform illustrated in FIG. 6. Similarly, switches G7 and G10 are used to connect line 96 alternately between the negative rail 66 and node 102, so as to provide the current waveform illustrated in FIG. 6.

Figure 7A:
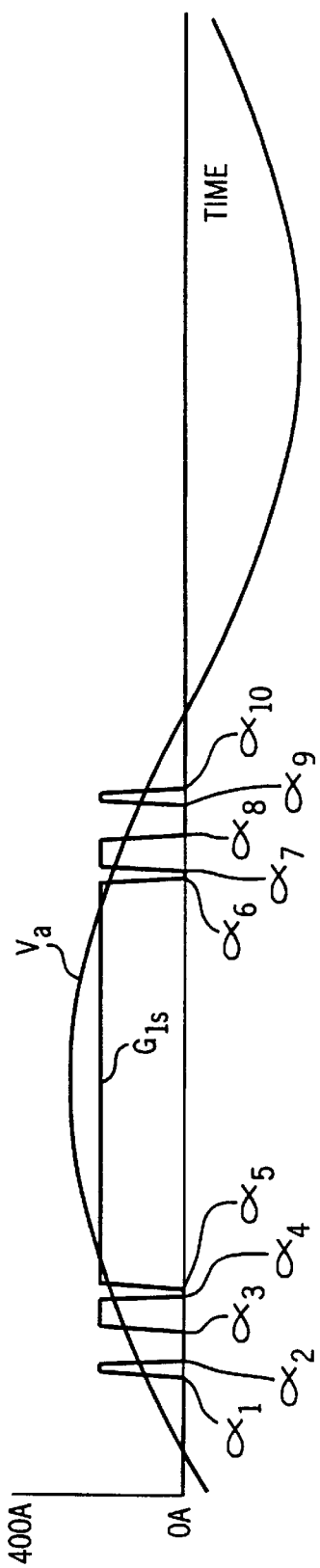
FIGS. 7a–7f are graphs illustrating switching device turn on sequences according to the present invention.
Figure 7B:
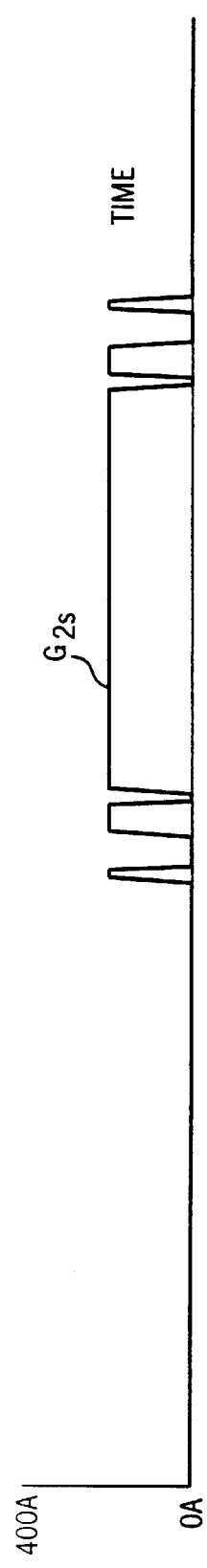
Figure 7C:
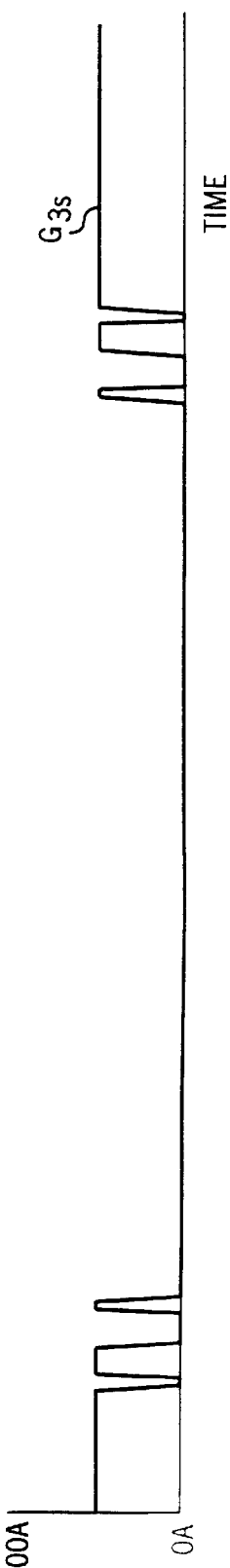
Figure 7D:
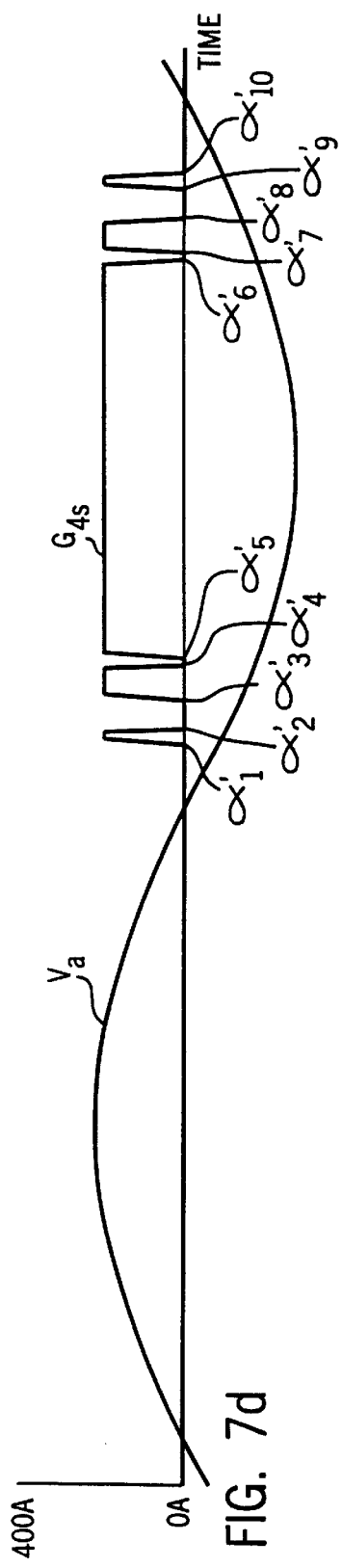
Figure 7E:
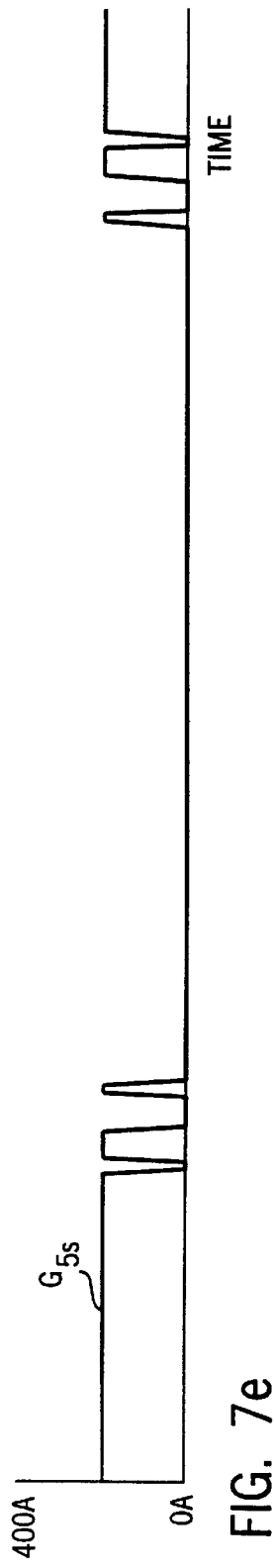

Referring now to FIGS. 4, 7*a* and 7*d*, FIG. 7*a* illustrates a preferred on-off sequence $G_{1s}$ for switch G1 and FIG. 7*d* illustrates a preferred on-off sequence $G_{4s}$ for switch G4. During positive half-cycles of line voltage $V_{a1}$ switch G1 is turned on and off at chop angles $\alpha_1$ through $\alpha_{10}$. Similarly, during negative half-cycles of voltage $V_a$ switch G4 is turned on and off at chop angles $\alpha_1'$ through $\alpha_{10}'$.

Referring also to FIG. 8*a*, on-off sequences $G_{1s}$ and $G_{4s}$ generate current $I_{a1}'$ having positive $I_{ap}$ and negative $I_{an}$ components. During positive half-cycles of line voltage $V_{a1}$ on-off sequence $G_{1s}$ causes positive current $I_{ap}$ having pulses $P_1$–$P_5$. Similarly, during negative half-cycles of line voltage $V_{a1}$ on-off sequence $G_{4s}$ causes negative current $I_{an}$ having pulses $P_1'$–$P_5'$.

On-off sequences $G_{1s}$ and $G_{4s}$ defined by chop angles $\alpha_1$–$\alpha_{10}$ and $\alpha_1'$–$\alpha_{10}'$, respectively, eliminate the 11th and 13th harmonic current components. Thus, the current drawn on line 99 does not include the 11th and 13th harmonic components.

Figure 8C:
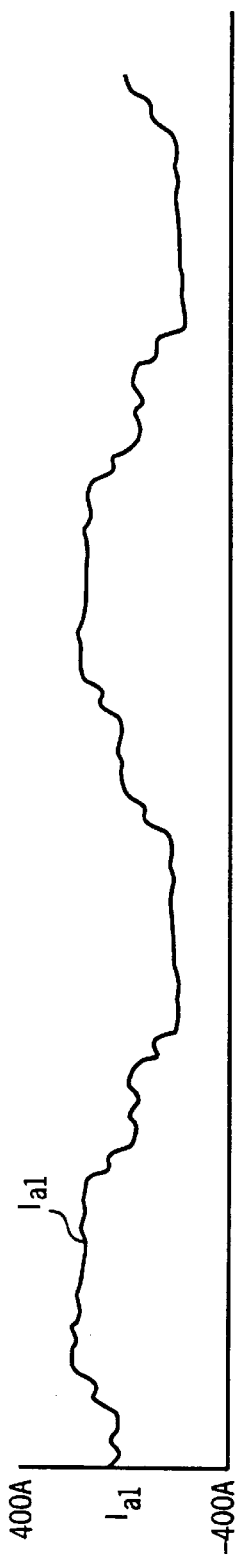
FIGS. 8c and 8d are graphs illustrating input currents associated with the input currents of FIGS. 8a and 8b, respectively.

Referring now to FIGS. 4, 8*a* and 8*c*, when switches G1 and G4 are turned on and off so as to draw current on line 90, the capacitive filter network $C_1$ which ties line 90 to node 95 tends to smooth the current drawn from winding 73 so that $I_{a1}$ is actually drawn. Nevertheless, the winding current still includes several harmonic current components (i.e. 5th, 7th, 17, and 19th).

Figure 7F:
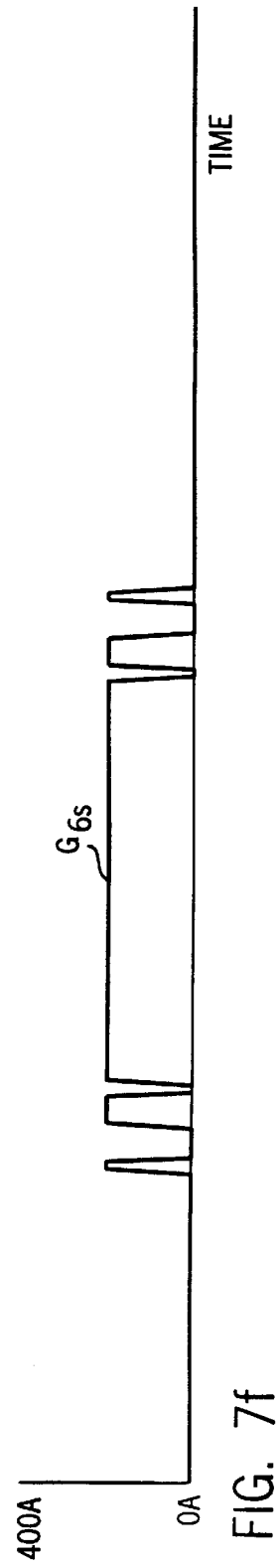

Referring to FIGS. 4, 7*b*, 7*c*, 7*e* and 7*f*, the on-off sequence $G_{2s}$ for switch G2 is illustrated in FIG. 7*b*, the sequence $G_{3s}$ for switch G3 is illustrated in FIG. 7*c*, the sequence $G_{5s}$ for switch G5 is illustrated in FIG. 7*c* and the sequence $G_{6s}$ for switch G6 is illustrated in FIG. 7*f*. All of the on-off sequences $G_{1s}$–$G_{6s}$ are identical except that they are phase shifted. Sequence $G_{1s}$ leads sequence $G_{2s}$ by 120° and leads sequence $G_{3s}$ by 240°. Similarly, sequence $G_{4s}$ leads sequence $G_{5s}$ by 120° and leads sequence $G_{6s}$ by 240°. Thus, although not illustrated, the currents drawn on lines 94 and 92 have the same form as the current drawn on line 90 but are phase shifted by 120° and 240°, respectively.

Referring specifically to FIGS. 4 and 7*a*–7*c*, on-off sequences $G_{1s}$–$G_{3s}$ are interleaved such that at any given time one and only one of the switches G1, G2 or G3 is turned on and conducting. Similarly, referring to FIGS. 4 and 7*d*–7*e*, on-off sequences $G_{4s}$–$G_{6s}$ are interleaved so that at any given time only one of switch G4, G5 or G6 is on and the other two are off. Referring also to FIG. 7*g*, with these switching sequences, the resulting load current is the desired direct current $I_{dc}$.

Referring again to FIGS. 4 and 7*a*–7*f*, the second converter 80*b* operates in a manner which is exactly like the first converter 80*a* with one notable exception. Because leg 82 is a Δ wound leg, voltage $V_{a2}$ lags voltage $V_{a1}$ by 30°. To accommodate the 30° voltage lag, on-off sequences for switches G7 through G12 are delayed or phase shifted by 30°.

Figure 8D:
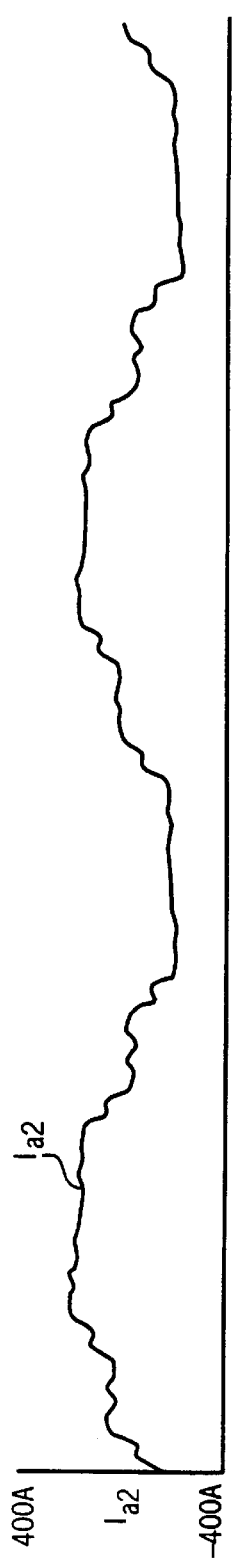
Figure 8E:
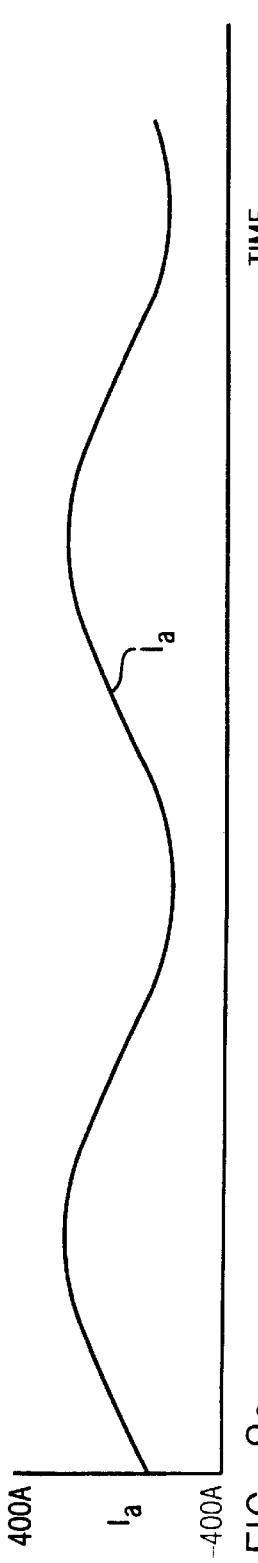
FIG. 8e is a graph illustrating line current drawn by the rectifier phase associated with FIGS. 8a and 8b.

For example, referring to FIG. 8*a*, switch G1 is controlled so as to generate pulses $P_1$–$P_5$ during each positive half-cycle of voltage $V_{a1}$ and switch G4 is controlled to generate pulses $P_1'$–$P_5'$ during each negative half-cycle of voltage $V_{a1}$ on line 90. Similarly, referring also to FIG. 8b, switch G7 is controlled to generate pulses like pulses $P_1$–$P_5$ during each positive half-cycle of line voltage $V_{a2}$ on line 101 and switch G10 is controlled to generate negative pulses like pulses $P_1'$–$P_5'$ during each negative half-cycle of voltage $V_{a2}$ on line 101. Together switches G7 and G10 draw current $I_{a2}'$ at point 101. The on-off sequences for switches G7–G12 lag the sequences for switches G1–G6 by 30°. Referring to FIGS. 8b and 8d, when line current $I_{a2}'$ is drawn, the capacitive filter network $C_2$ smoothes out the current such that the current drawn from phase a of the transformer is $I_{a2}$. Transformer current $I_{a2}$ is approximately sinusoidal but still includes 5th, 7th, 17th and 19th harmonic current components.

Although not illustrated, the on-off sequences for switches G8, G9, G11 and G12 and resulting line currents drawn on lines 100 and 98 are identical to the sequences for switches G2, G3, G5 and G6 and resulting currents drawn on line 94 and 92 except that the sequences and currents drawn are delayed by 30°.

Referring to FIGS. 4 and 8c through 8e, both secondary transformer winding sets 78 and 80 are linked to primary winding set 76. Therefore, each secondary set 78 and 80 draws current in windings 67, 69 and 74 of set 76. Thus, currents $I_{a1}$ and $I_{a2}$ drawn on lines 90 and 96 each cause a separate current in line 68 (via winding 67). The two drawn currents on line 68 add to equal input line current $I_a$ illustrated in FIG. 8e which is approximately sinusoidal and includes minimal harmonic components.

It should be appreciated that a simple apparatus has been described for reducing harmonic current components in utility supply lines caused by voltage rectification. To this end, the described apparatus eliminates various harmonic current components by using a Y—Y, Y-Δ transformer configuration and eliminates other low order harmonics using controllable switches and a preferred switching sequence. While the preferred switching frequency is relatively low (e.g. 300 Hz for a 60 Hz line frequency), the effective switching frequency is much higher (e.g. 780 Hz) and therefore required filter network size can be minimized.

II. Inverter

The inventive inverter operates on the same basic theory as the rectifier described in detail above. The inverter reduces harmonics in AC current applied to a load by using two different switching patterns which are 30° out of phase to provide two output currents for each of three phases wherein each output current includes a number of harmonics and one current for each phase lags the other current by 30° so that when the currents add together the harmonics cancel and a substantially sinusoidal AC output current results.

Figure 9:
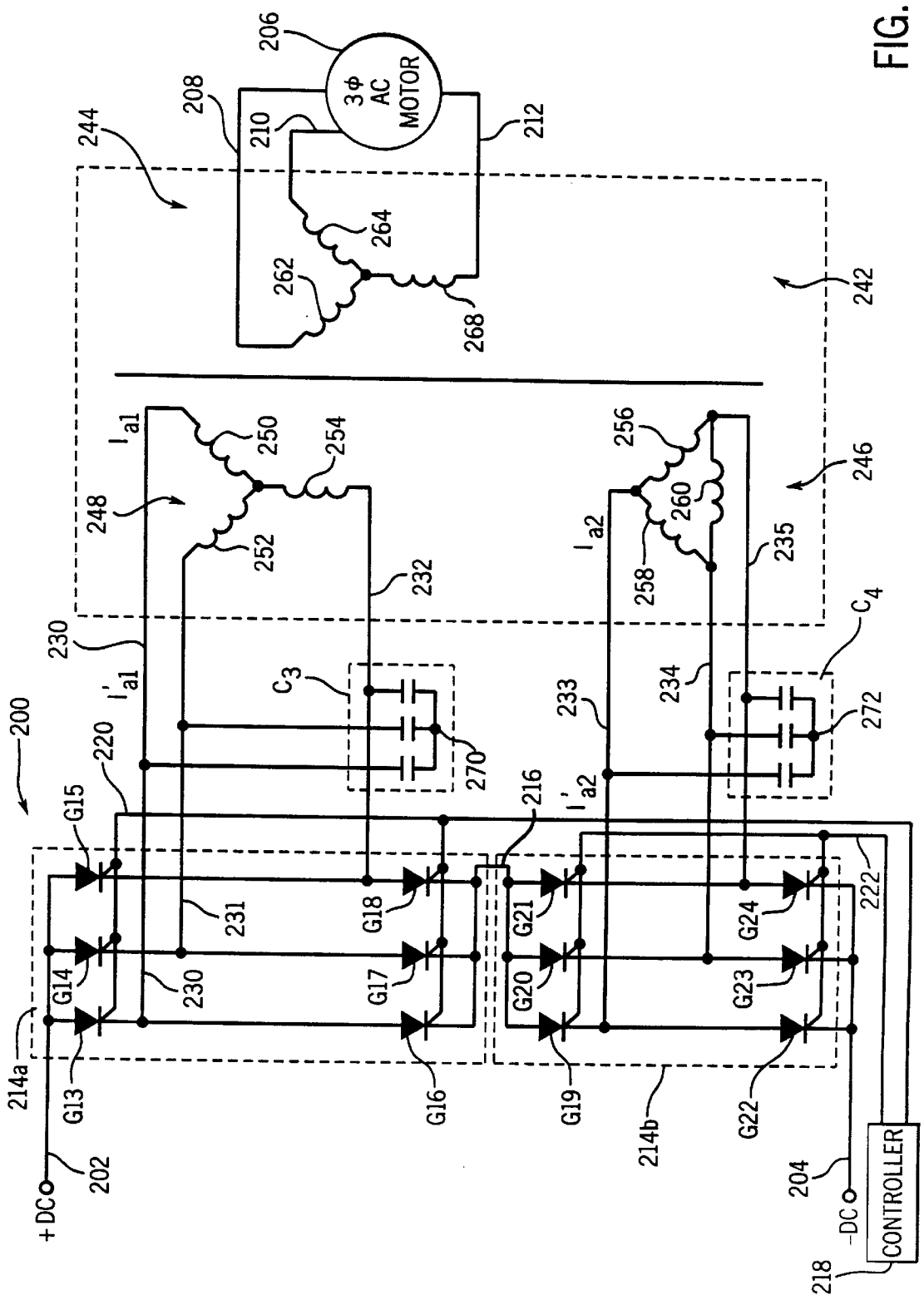
FIG. 9 is a schematic of an inverter according to the present invention.

To this end, referring first to FIG. 9, an inventive inverter/transformer configuration receives DC voltage on positive and negative DC rails 202, 204, respectively, and converts the DC voltage to three-phase AC voltage which is supplied to a three phase AC motor 206 via three output lines 208, 210 and 212. The configuration generally includes a two module inverter referenced by the numeral 200, a "Y—Y", "Δ-Y" transformer 242 and a controller 218. The inverter 200 includes twelve separate gate turn-off (GTO) switches G13, G14, G15, G16, G17, G18, G19, G20, G21, G22, G23 and G24 which are arranged so as to form first and second PWM converters 214a, 214b wherein the negative rail of the first converter 214a is connected to the positive rail of the second converter 214b, the positive rail of the first converter 214a is connected to positive DC rail 202 and the negative of the second converter 214b is connected to negative DC rail 204. For the purposes of this explanation, the negative rail of converter 214a will be referred to as central node 216.

Referring still to FIG. 9, first and fourth switches G13, G16 are arranged as a series pair between node 216 and positive rail 202 with the cathode of switch G16 connected to node 216 and the anode of switch G13 connected to the positive rail 202. Similarly, switches G14 and G17 and switches G15 and G18 are also arranged in series pairs between central node 216 and positive DC rail 202 so that current travels through those switches from positive rail 202 to node 216. Switches G19 and G22 are arranged as a series pair between negative DC rail 204 and node 216 so that current passes from node 216 to negative rail 204. Similarly, switches G20 and G23 and switches G21 and G24 are also arranged as series pairs between negative rail 204 and node 216.

There are six separate output lines leading out of inverter 200 including lines 230, 231, 232, 233, 234 and 235. Output 230 is connected at a node between switches G13 and G16, line 231 is connected at a node between switches G14 and G17, line 232 is connected between switches G15 and G18, line 233 is connected between switches G19 and G22, line 234 is connected between switches G20 and G23 and line 235 is connected between switches G21 and G24. Output lines 230, 231 and 232 which are connected to the first converter 214a lead to a first set of primary windings 248 of transformer 242. Similarly, output line 233, 234 and 235 that lead from the second converter 214b are connected a second set of primary windings 246 of transformer 242.

Transformer 242 includes primary windings 248 and 246 and a single set of secondary windings 244. Winding set 248 consists of three Y-connected windings 250, 252 and 254 whereas winding set 246 consists of three Δ-connected windings 256, 258 and 260. Set 244 consists of three Y-connected windings 262, 264 and 268, each of the separate windings 262, 264 and 268 connected to a separate one of the output lines 208, 210 and 212, respectively. Sets 248 and 244 together form a first intermediate source and sets 240 and 244 form a second intermediate source.

A capacitive filter network represented collectively by the reference character $C_3$ is provided between first converter 214a and winding set 248 and consists of three separate capacitors, one capacitor provided between each of lines 230, 231 and 232 and a common node 270. Similarly, another capacitive network $C_4$ is provided between second converter 214 and winding set 246 which consists of three separate capacitors, one capacitor provided between each of lines 233, 234 and 235 and a common node 272.

A PWM controller 218 is provided for turning the switches G13 through G24 on and off and thus controls conducting periods of each of the switches G13 through G24. The controller 218 is connected to the switches of converter 214a via a first bus 220 and is connected to the switches converter 214b via a second bus 222. The first bus 220 includes six separate control lines (not shown), one line for each of the six switches G13 through G18 while the second bus 222 likewise includes six separate control lines (not shown), one for each of switches G16 through G24. Each control line is connected to a separate gate terminal of an associated switch G13 through G24 to provide control signals to the switch.

Because both the first and second converters 214a and 214b operated in the same manner, in order to simplify this explanation, only operation of the first converter 214a will be described in detail and where necessary to understand an operation of the invention the combined effects of the two converters 214a and 214b will be explained.

In addition, because each of the series pair of switches in each converter operates in the same manner, only a single pair of switches including switches G13 and G16 will be described here in detail and operation of other switches will only be described where necessary to understand the invention.

Referring still to FIG. 9, a DC voltage is provided across rails 202 and 204. Referring also to FIG. 8a controller 218 is used to control switches G13 and G16 so as to provide switching patterns $P_1$–$P_5$ and $P_1'$–$P_5'$ and associated current $I_{a1}'$ on line 230. Similarly, referring also to FIG. 8b, controller 218 controls switches G19 and G22 in a manner which produces current $I_{a2}'$ on line 233.

Referring still to FIG. 8c, capacitor bank $C_3$ reduces some of the harmonics on line 230 so that current entering winding 250 is more sinusoidal (e.g. $I_{a1}$). Similarly, referring to FIG. 8d, capacitor bank $C_4$ reduces harmonics on line 233 producing current $I_{a2}$.

Winding set 248 is independently coupled to set 244 such that current in winding 250 (i.e. in line 230) will induce a similar current in winding 262 and through line 208. Similarly, set 246 is independently coupled to set 244 such that current entering winding set 246 on line 233 induces a current in winding 262 and through line 208. Thus transformer 242 in effect adds currents $I_{a1}$ and $I_{a2}$. As with the rectifier, because currents $I_{a1}$ and $I_{a2}$ are 30° out of phase, when they are added the 5th, 7th, 17th and 19th harmonic current components cancel and a substantially sinusoidal output current ($I_a$ in FIG. 8e) is generated on line 208.

Controller 218 controls switches G14, G15, G17, G18, G20, G21, G23 and G24 so as to generate currents which are similar to current $I_{a1}'$ in FIG. 8a except that they occur during different phases. In particular, currents on lines 231, 232, 234 and 235 mirror current $I_{a1}'$ except that the current on line 231 lags the current on line 230 by 120°, the current on line 232 lags the current on line 230 by 240°, the current on line 234 lags the current on line 231 by 30° and the current on line 235 lags the current on lined 232 by 30°.

Thus, referring again to FIG. 8a, with the inventive inverter the switching frequency required to provide substantially AC output current is only five times greater than the required output current frequency. This is because many harmonics are eliminated by generating two currents which are out of phase by 30° and include several harmonics and then adding the currents to eliminate the harmonics.

This concludes the detailed description of the preferred embodiment. However, it should be appreciated by those skilled in the art that the description herein is given only by way of example and that various modifications and additions might be made while still coming within the scope of the invention. In particular, while one switching sequence has been described, the invention can be used with many different switching sequences and may in fact include a higher switching frequency for controlling voltage amplitude or calculated to eliminate other current harmonic components. In addition, while GTOs are preferred, any controllable switching device could be used to provide PWM operation. Moreover, the Δ and Y secondary legs and associated switching sequences could be switched. The filter networks $C_1$, $C_2$, $C_3$ and $C_4$ should be designed to eliminate the 23rd and other higher order harmonics where a two module configuration is provided.

In addition, while the invention is described in the context of a Y—Y, Δ-Y transformer configuration, the invention is not meant to be so limited and includes a Δ-Y, Δ—Δ configuration which is more common in certain parts of the world.

Moreover, the invention is also meant to include other than the two module configuration described above. For example, the invention may include a three module rectifier configuration wherein three PWM converters are stacked in series, each receiving three phase input voltage from a separate supply. Thus, the invention also includes an n-module rectifier for reducing harmonics on supply lines of a three phase AC voltage source while causing minimal switching losses, the rectifier comprising n intermediate sources, each source isolated from all other sources, separately linked to the supply lines and supplying line voltages to a separate set of intermediate lines, voltages on the mth set of intermediate lines phase shifted from voltages on a first set of intermediate lines by (m−1)*(60/n), n PWM converters, the nth converter linked to the nth intermediate source and the (n−m)th converter linked to the (n−m)th intermediate source where m is an integer between 2 and n, each converter including a positive rail and a negative rail, the first converter positive rail providing a positive DC rail, the nth converter negative rail providing a negative DC rail, the mth converter negative rail connected to the (m+1)th converter positive rail and the mth converter positive rail connected to the (m−1)th converter negative rail, a controller controlling the first converter to draw a first set of cyclical currents of the first set of intermediate lines and to draw an mth set of cyclical currents on the mth set of intermediate lines, the mth set of currents on the mth set of intermediate lines phase shifted from currents on the first set of intermediate lines by (m−1)*(60/n), and n high pass filter networks, one network connected to each set of intermediate lines.

The converters are driven to eliminate some harmonics and others are eliminated by drawing currents from the supplies which are out of phase.

Furthermore, the inventive principles can be applied to ζ-module configurations where ζ is greater than 3.

To apprise the public of the scope of this invention, we make the following claims.

We claim:

1. A rectifier for reducing harmonics on supply lines of a three phase AC voltage source while causing minimal switching losses, the rectifier comprising:

a first intermediate source linked to the supply lines and providing the supply voltages to first, second and third intermediate lines;

a second intermediate source linked to the supply lines, phase shifting the supply voltages by 30 degrees and providing the shifted voltages on fourth, fifth and sixth intermediate lines;

a first PWM converter linked to the first, second and third intermediate lines, the first converter linking a positive DC rail to a neutral node;

a second PWM converter linked to the fourth, fifth and sixth intermediate lines, the second converter linking the neutral node and a negative DC rail;

a controller controlling the first converter to draw first, second and third cyclical currents on the first, second and third intermediate lines, the first current including some harmonics less than the 22nd harmonic and not including the 11th or 13th harmonics, the second and third currents mirroring and lagging the first current by 120 and 240 degrees respectively, and controlling the second converter to draw fourth, fifth and sixth cyclical currents on the fourth, fifth and sixth intermediate lines, the fourth, fifth and sixth currents lagging the first, second and third currents, respectively, by 30 degrees;

a first high pass filter network connected to the first, second and third intermediate lines; and a second high pass filter network connected to the fourth, fifth and sixth intermediate lines.

2. The rectifier of claim 1 wherein the first filter network includes a first capacitor bank including a first capacitor connected between the first intermediate line and a neutral node, a second capacitor connected between the second intermediate line and the neutral node and a third capacitor connected between the third intermediate line and the neutral node and the second filter network includes a second capacitor bank including a fourth capacitor connected between the fourth intermediate line and a neutral node, a fifth capacitor connected between the fifth intermediate line and the neutral node and a sixth capacitor connected between the sixth intermediate line and the neutral node.

3. The rectifier of claim 1 wherein the first intermediate source is a Y—Y configured transformer and the second intermediate source is a Y-delta configured transformer.

4. The rectifier of claim 1 wherein the first intermediate source is a delta—delta configured transformer and the second intermediate source is a delta-Y configured transformer.

5. The rectifier of claim 1 wherein the switching frequency of the first and second converters is five times the line frequency of the supply line voltage.

6. The rectifier of claim 5 wherein the supply line voltage has a frequency of 60 Hz.

7. A method to be used with a rectifier for reducing harmonics on all three supply lines of a three phase AC voltage source during voltage rectification, the method used with a rectifier including first and second PWM converters wherein the first converter is linked to first, second and third intermediate lines and provides output voltage between a positive DC rail and a central node and the second converter is linked to fourth, fifth and sixth intermediate lines and provides output voltage between the central node and a negative DC rail, the first, second and third intermediate lines isolated from the fourth, fifth and sixth intermediate lines, the rectified voltage provided between the positive and negative DC rails, the method comprising the steps of:

providing the supply line voltages on the first, second and third intermediate lines;

shifting each of the three supply line voltages by 30 degrees and supplying the shifted voltages on the fourth, fifth and sixth intermediate lines;

drawing first, second and third cyclical line currents on the first, second and third intermediate lines, respectively, wherein the first line current includes at least some harmonics of the 22nd or lower order and does not include 11th and 13th harmonics and the second and third line currents mirror and lag the first line current by 120 and 240 degrees, respectively; and drawing fourth, fifth and sixth cyclical line currents on the fourth, fifth and sixth intermediate lines, respectively, wherein the fourth, fifth and sixth line currents mirror and lag the first, second and third currents by 30 degrees, respectively.

8. The method of claim 7 wherein the step of providing the supply line voltages includes the step of passing the AC supply voltages through a Y—Y connected transformer and the step of shifting the supply line voltages includes the step of passing the AC supply voltages through a Y-delta connected transformer.

9. The method of claim 7 wherein the step of providing the supply line voltages includes the step of passing the AC supply voltages through a delta—delta connected transformer and the step of shifting the supply line voltages includes the step of passing the AC supply voltages through a delta-Y connected transformer.

10. A three phase inverter receiving DC voltage on positive and negative DC rails and converting the DC voltage to three phase AC voltage on first, second and third output lines, the inverter minimizing output line harmonics and switching losses, the inverter comprising:

a first PWM converter linking the positive DC rail and a central rail and having first, second and third intermediate lines;

a second converter linking the central rail and the negative DC rail and having fourth, fifth and sixth intermediate lines;

a controller controlling the first converter to provide first, second and third cyclical currents on the first, second and third intermediate lines wherein the first current includes at least some harmonics less than the 22nd order and does not include 11th and 13th harmonics and the second and third currents mirror and lag the first current by 120 and 240 degrees, respectively, and controlling the second converter to provide fourth, fifth and sixth cyclical currents on the fourth, fifth and sixth intermediate lines, the fourth, fifth and sixth currents mirroring and lagging behind the first, second and third currents by 30 degrees, respectively;

a first intermediate source which links the first, second and third intermediate lines to the first, second and third output lines, respectively;

a second intermediate source which links the fourth, fifth and sixth intermediate lines to the first, second and third output lines, respectively;

a first high pass filter network connected to the first, second and third intermediate lines; and a second high pass filter network connected to the fourth, fifth and sixth intermediate lines.

11. The inverter of claim 10 wherein the first network includes a first capacitor bank including a first capacitor connected between the first intermediate line and a neutral node, a second capacitor connected between the second intermediate line and the neutral node and a third capacitor connected between the third intermediate line and the neutral node and the second network includes a second capacitor bank including a fourth capacitor connected between the fourth intermediate line and a neutral node, a fifth capacitor connected between the fifth intermediate line and the neutral node and a sixth capacitor connected between the sixth intermediate line and the neutral node.

12. The inverter of claim 10 wherein the first intermediate source is a Y—Y configured transformer and the second intermediate source is a delta-Y configured transformer.

13. The inverter of claim 10 wherein the first intermediate source is a delta—delta configured transformer and the second intermediate source is a Y-delta configured transformer.

14. The inverter of claim 10 wherein the switching frequency of the converter switches is five times the line frequency of the supply line voltage.

15. The inverter of claim 14 wherein the supply line voltage has a frequency of 60 Hz.

16. A method to be used with an inverter for reducing output line harmonics and switching losses when a DC voltage is inverted to provide three phase AC voltage on first, second and third output lines, the method to be used with an inverter including first and second series connected PWM converters, the first converter positioned between a positive DC rail and a central rail and the second converter positioned between the central rail and a negative DC rail, the method comprising the steps of:

controlling the first converter to provide first, second and third cyclical line currents on the first, second and third intermediate lines, respectively, wherein the first line current does not include 11th and 13th harmonic components but does include at least some harmonics lower than the 22nd order, the second and third currents mirror and lag the first current by 120 and 240 degrees, respectively;

controlling the second converter to provide fourth, fifth and sixth cyclical line currents on the fourth, fifth and sixth intermediate lines, respectively, wherein the fourth, fifth and sixth intermediate lines are isolated from the first, second and third intermediate lines and wherein the fourth, fifth and sixth line currents mirror and lag the first, second and third currents by 30 degrees, respectively;

adding the first and fourth line currents and providing the sum on the first output line, adding the second and fifth line currents and providing the sum on the second output line and adding the third and sixth line currents and providing the sum on the third output line.

17. The method of claim 16 used with a Y—Y, delta-Y transformer wherein there is a single secondary Y winding set, the output of the secondary winding being connected to the first, second and third output lines, and wherein the steps of adding the first and fourth, second and fifth and third and sixth currents includes the step of linking the first, second and third intermediate lines to the Y—Y transformer and linking the fourth, fifth and sixth intermediate lines to the delta-Y transformer.

18. The method of claim 16 used with a delta—delta, Y-delta transformer wherein there is a single secondary delta winding set, the output of the secondary winding being connected to the first, second and third output lines, and wherein the steps of adding the first and fourth, second and fifth and third and sixth currents includes the step of linking the first, second and third intermediate lines to the delta—delta transformer and linking the fourth, fifth and sixth intermediate lines to the Y-delta transformer.

19. An n-module rectifier for reducing harmonics on supply lines of a three phase AC voltage source while causing minimal switching losses, the rectifier comprising:

n intermediate sources, each source isolated from all other sources, separately linked to the supply lines and supplying line voltages to a separate set of intermediate lines, voltages on the mth set of intermediate lines phase shifted from voltages on a first set of intermediate lines by $(m-1)*(60/n)$;

n PWM converters, the nth converter linked to the nth intermediate source and the (n−m)th converter linked to the (n−m)th intermediate source where m is an integer between 2 and n, each converter including a positive rail and a negative rail, the first converter positive rail providing a positive DC rail, the nth converter negative rail providing a negative DC rail, the mth converter negative rail connected to the (m+1)th converter positive rail and the mth converter positive rail connected to the (m−1)th converter negative rail;

a controller controlling the first converter to draw a first set of cyclical currents of the first set of intermediate lines and to draw an mth set of cyclical currents on the mth set of intermediate lines, the mth set of currents on the mth set of intermediate lines phase shifted from currents on the first set of intermediate lines by $(m-1)*(60/n)$; and n high pass filter networks, one network connected to each set of intermediate lines.

20. An n-module inverter receiving DC voltage on positive and negative DC rails and converting the DC voltage to three phase AC voltage on first, second and third output lines, the inverter minimizing output line harmonics and switching losses, the inverter comprising:

n PWM converters, each converter including a positive rail and a negative rail, the first converter positive rail linked to the positive DC rail, the nth converter negative rail linked to the negative DC rail, the mth converter negative rail connected to the (m+1)th converter positive rail and the mth converter positive rail connected to the (m−1)th converter negative rail, where m is an integer between 2 and n, each converter linked to a separate set of intermediate lines;

a controller controlling the first converter to provide a first set of cyclical currents of the first set of intermediate lines and to provide an mth set of cyclical currents on the mth set of intermediate lines, the mth set of currents on the mth set of intermediate lines phase shifted from currents on the first set of intermediate lines by $(m-1)*(60/n)$;

n intermediate sources, each source isolated from all other sources, separately linked to a unique set of the intermediate lines, and linked to the output lines; and n high pass filter networks, one network connected to each set of intermediate lines.

* * * * *